United States Patent [19]
Dunne

[11] Patent Number: 6,055,490
[45] Date of Patent: Apr. 25, 2000

[54] APPARATUS AND METHOD FOR DETERMINING PRECISION REFLECTIVITY OF HIGHWAY SIGNS AND OTHER REFLECTIVE OBJECTS UTILIZING AN OPTICAL RANGE FINDER INSTRUMENT

[75] Inventor: Jeremy G. Dunne, Littleton, Colo.

[73] Assignee: Laser Technology, Inc., Englewood, Colo.

[21] Appl. No.: 09/123,054

[22] Filed: Jul. 27, 1998

[51] Int. Cl.$^7$ ...................................................... G01S 13/86
[52] U.S. Cl. ........................ 702/159; 702/159; 356/5.01; 342/95
[58] Field of Search .............................. 702/159; 342/23, 342/54, 94, 95; 356/5.01; 358/475, 445; 359/885

[56] References Cited

U.S. PATENT DOCUMENTS

| | | | |
|---|---|---|---|
| 5,291,262 | 3/1994 | Dunne | 356/5 |
| 5,359,404 | 10/1994 | Dunne | 356/5 |
| 5,521,696 | 5/1996 | Dunne | 356/5.07 |
| 5,781,147 | 7/1998 | Elliott et al. | 342/54 |

OTHER PUBLICATIONS

ASTM Designation E 810—94 Standard Test Method for Coefficient of Retroreflection of Retroreflective Sheeting.

*Primary Examiner*—Kamini Shah
*Attorney, Agent, or Firm*—John R. Wahl; William J. Kubida; Hogan & Hartson LLP

[57] ABSTRACT

An apparatus and method for measuring coefficients of retroreflectance of retroreflective surfaces such as road signs involves use of a modified light based range finder. The apparatus includes a power attenuation factor data base which relates pulse width of received pulses to power attenuation of the transmitted pulses. The range finder calculates target range based on time of flight of light pulses. The apparatus automatically calculates the absolute coefficient of retroreflectance for an unknown reflective surface being measured by comparison of the measurement to a reading with the same instrument of a known reflectance standard. The method involves either recalling a stored standard reference reflectance factor or determining a reflectance factor via the range finder for a sample of retroreflective material with a predetermined coefficient of retroreflectance, and then measuring the distance to an unknown target, determining a power attenuation factor from the received pulse width from the unknown target and then calculating the absolute coefficient of retroreflectance based upon these determined values of power attenuation factor, distance and the reference reflectance factor.

20 Claims, 6 Drawing Sheets

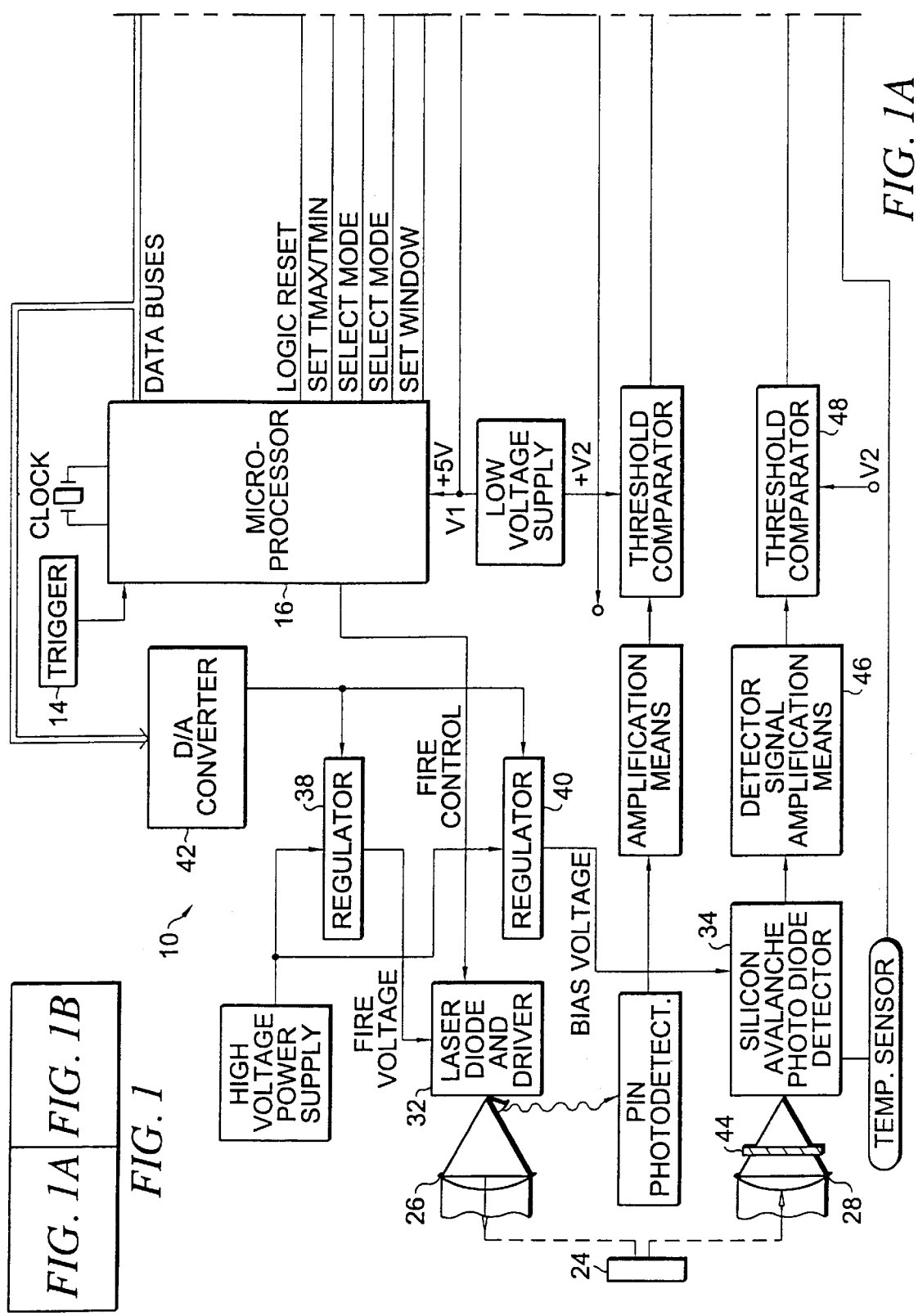

APPARATUS AND METHOD FOR DETERMINING PRECISION REFLECTIVITY OF HIGHWAY SIGNS AND OTHER REFLECTIVE OBJECTS UTILIZING AN OPTICAL RANGE FINDER INSTRUMENT

BACKGROUND OF THE INVENTION

1. Field of the Invention

The present invention relates, in general, to the field of precision ranging instruments. More particularly, the present invention relates to an apparatus and method for utilizing a light based speed and/or range finder apparatus to determine absolute reflectivity of reflective objects such as highway directional and informational signs.

2. Description of Related Art

Retroreflective sheeting is commonly used to provide reflective informational signs along highways, on roadways and on safety barriers along roadways. For example, stop signs, caution signs and highway directional signs often have such sheeting materials or coatings to enhance the visibility of the signs and especially the lettering to motorists traveling at night.

The only illumination of these signs is provided by the oncoming vehicle headlights. The retroreflective sheeting suffers from the disadvantage that its reflectivity deteriorates with age and exposure to the environmental effects of sun, wind, and precipitation. These signs must therefore be periodically inspected, refurbished and/or replaced. Anticipated state and/or federal government regulations for reflectivity of road signs may soon require that periodic measurements of sign reflectance or more frequent sign replacements be undertaken to meet reflectivity standards.

It is currently extremely difficult to accurately measure reflectivity of such signs along roadways in the field. Measurements of a sign's reflectivity require very precise instrument locations close to the sign, precise lighting conditions, and often require either sign removal or closure of the highway portion immediately in front of the sign while the required lighting and sensing instruments are set up and measurements taken. Such road closures or driving restrictions placed on motorists are inconvenient and generate a safety concern not only for the instrument operators taking measurements, but also to motorists in the vicinity. Currently, a sign must be relocated to a test facility where a light source and suitable filters may be accurately positioned in order to perform the measurements. Alternatively, the test setup may be implemented at the sign location, but such field measurements are prone to errors which may be unacceptable to meet new standards which may be forthcoming. Consequently, there is a need for a convenient and safe method for remotely ascertaining absolute reflectivity of a sign surface.

Another problem is that the reflectivity of many signs deteriorates nonuniformly. Portions of the sign which receive more direct sunlight or are colored with more light sensitive paint materials deteriorates faster than other portions. Consequently, accurate determinations of sign reflectivity are difficult to make and reflectivity determinations of important portions of the sign, such as the letters and numbers, as opposed to background portions, may be highly inaccurate. Therefore there is a need for a method of accurate reflectivity determinations for selected portions of signs rather than the entire sign.

SUMMARY OF THE INVENTION

It is therefore an object of the present invention to provide a method for measuring accurately the absolute reflectivity of a selected surface such as a sign surface that has retroreflective material thereon.

It is another object of the present invention to provide a hand held measuring apparatus for determining the absolute reflectivity of a retroreflective surface.

It is another object of the present invention to provide an apparatus and method for determining absolute reflectivity or a retroreflective surface of a roadway sign in the field with a hand held instrument.

It is a still further object of the present invention to provide an apparatus and method for remotely determining absolute reflectivity of a retroreflective surface.

The modified range finder apparatus used in the present invention preferably is a modified conventional hand held range finder such as an Impulse 100 manufactured by Laser Technology, Inc. This range finder utilizes a laser diode to emit pulses of infrared light toward a target. The range finder also may utilize a less expensive LED in place of the laser diode. Accordingly, throughout this specification it is to be understood that use of the term "laser" is used for convenience in explanation only. The LED may also be utilized with suitable excitation circuitry.

The Impulse type of speed and/or range finder includes a received (RX) pulse pulse width determining circuit to develop and apply, via the instrument's microprocessor, a correction factor to distance measurements. This correction is conventionally necessary since the distance measurement circuitry operates from the leading edges of the transmit and receive pulses to determine the time of flight of the pulse to and from the target. Since the strength of the received pulses may vary in amplitude, and hence pulse width varies, depending upon target distance, reflectivity, atmospheric conditions, etc., correction is necessary to achieve truly accurate distance measurements. This correction is accomplished by incorporating a database in ROM in the apparatus containing empirically determined correction factors for given pulse widths of the return signals.

The apparatus in accordance with the present invention may be a single purpose instrument for measuring reflectance or may be a ranging and/or speed measuring instrument which includes a separate mode of operation which utilizes, in addition to the distance correction factor data base and pulse width correction described above, another data base to measure reflectance of a reflective surface and indicate the absolute coefficient of retroreflection for an unknown reflective surface being measured by comparison of the measurement to a reading with the same instrument of a known reflectance standard. This reflectance mode of operation is made possible by implementation of a procedure to determine a compilation of power attenuation factors (Ka), utilizing the same fixed distance calibration setup as was utilized in the distance correction factor calibration mentioned above, which are stored in the apparatus and utilized to compute absolute values of the coefficient of retroreflection, RA, of a target surface. One further lookup table is preferably provided in the apparatus in accordance with the present invention for use in the reflectance mode of operation. This is a lookup table of reference standard reflectances for various colors and reflective surfaces, which have currently been standardized into classes.

The modified range finder apparatus in accordance with the present invention preferably includes EEPROMs which contain the distance correction and reflectance databases as well as the lookup table of standard material reflectances as well as a storage register for storing the reading of a known standard retroreflective surface of the type to be evaluated in the field.

The modified range finder further includes software in ROM to analyze the return signal strengths and compute the absolute retroreflectance coefficient for the sign or sign surface being measured. The resulting retroreflectance coefficient is indicated directly on a display and may optionally be ported through a UART interface connection for downloading to a personal computer or other processor device for further data manipulation and/or storage.

Basically the method of measuring an absolute reflectivity value of a retroreflective surface utilizing a light emitting range finder (e.g. laser or LED) in accordance with the present invention comprises, in the reflectance mode of operation, either recalling a previously stored reference reflectance factor from the instrument database or, if increased accuracy is desired, entering into the instrument database the known reflectance for the surface type to be measured in the field and taking a reflectance reading on a known standard retroreflective surface of the type to be measured in the field in order to determine an accurate reference reflectivity factor and then going into the field and taking a reading of the unknown retroreflective surface. The latter reading is utilized with the reference reflectance factor (determined from the internal instrument database or by actual measurement) to calculate the absolute reflectance of the unknown surface. The resulting absolute reflectance measurement is then displayed, stored or downloaded as required by the user.

The method for determining the absolute reflectance of a retroreflective surface at a distance from the surface utilizing a light emitting range finder comprises the steps of:

emitting a light pulse toward an unknown retroreflective surface;

receiving a return pulse from the unknown retroreflective surface;

measuring a pulse width for the unknown return pulse;

determining a distance between the range finder and the unknown surface;

determining a power attenuation factor for the measured pulse width;

recalling a reference reflectance factor for the unknown retroreflective surface from a database in said range finder;

computing a coefficient of retroreflectivity for the unknown retroreflective surface from the power attenuation factor determined from the measured pulse width, the distance to the unknown surface, and the reference reflectance factor.

If increased accuracy is desired, a currently determined reference reflectance factor may be experimentally determined and utilized instead of the recalled factory installed value. In this case, the method for determining the absolute reflectance of a retroreflective surface at a distance from the unknown surface utilizing a light emitting range finder more particularly comprises the steps of:

emitting a light pulse aimed toward a known retroreflective surface having a predetermined coefficient of reflectivity;

receiving a return pulse from the known retroreflective surface;

measuring a return pulse width from the return pulse;

determining a power attenuation factor for the measured return pulse width;

determining a distance between the known surface and the range finder;

computing a reference reflectance factor of the known retroreflective surface from the power attenuation factor for the measured return pulse width from the known surface, the measured distance to the known surface, and a predetermined standard coefficient of retroreflectivity for the known retroreflective surface;

emitting a light pulse toward an unknown retroreflective surface;

receiving a return pulse from the unknown retroreflective surface;

measuring a pulse width for the return pulse from the unknown surface;

determining a distance between the range finder and the unknown surface;

determining a power attenuation factor for the measured pulse width of the return pulse from the unknown surface;

computing a coefficient of retroreflectivity for the unknown retroreflective surface from the power attenuation factor for the return pulse from the unknown surface, the distance to the unknown surface, and the computed reference reflectance factor.

More particularly, the method comprises the steps of:

providing a range finder for transmitting a light signal pulse toward a target and receiving a return light signal pulse from the target and determining a received pulse width and target distance therefrom;

transmitting a first light pulse toward a known target;

receiving a first return pulse from the known target;

determining a first pulse width for the first return pulse;

determining a first distance from the range finder to the known target from the time of flight of the transmitted pulse to and from the known target;

determining a first power attenuation factor for the first return pulse from the first pulse width and a power attenuation factor data base; and calculating a reference reflectance factor for the known target from the distance to the known target and the first power attenuation factor and a predetermined coefficient of retroreflectance for the known target; and utilizing the calculated reference reflectance factor to measure an absolute coefficient of retroreflectance of an unknown retroreflective surface.

The step of utilizing according to the present invention further preferably includes the steps of:

measuring a distance to an unknown retroreflective target surface by time of flight of a second light pulse to and from the unknown target;

measuring a second pulse width of the light pulse returning from the unknown target;

determining a second power attenuation factor ($Ka_{unknown}$) for the second light pulse returning from the unknown target;

calculating an absolute coefficient of retroreflectance (RA) for the unknown target from the reference target reflectance ($K_{tref}$), the second power attenuation factor for the unknown target return pulse width ($Ka_{unknown}$) and the distance to the unknown target ($d_{unknown}$) according to the equation $RA_{unknown} = K_{tref} * d_{unknown}^2 / Ka_{unknown}$.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF THE INVENTION

The apparatus and method in accordance with the present invention preferably involves the use of a modified conventional pulse laser range finder instrument such as is disclosed in U.S. Pat. Nos. 5,291,262 and 5,521,696, issued to Laser Technology, Inc. of Englewood, Colo., the assignee of the present invention, which are both hereby incorporated by reference in their entirety.

Although a laser range finder is described in this detailed description, the apparatus of the present invention may be incorporated into a range finder which utilizes a light emitting diode (LED) instead of a laser diode as a light source as is described in my copending U.S. patent application Ser. No. 08/904,194, filed on Jul. 31, 1997 and entitled DISTANCE MEASUREMENT AND RANGING INSTRUMENT HAVING A LIGHT EMITTING DIODE-BASED TRANSMITTER, also hereby incorporated by reference herein in its entirety. Use of an LED instead of a laser diode may substantially reduce the cost of such an apparatus. Accordingly, in the descriptions which follow, it is to be understood that an LED may be substituted in place of a laser diode, and such a substitution may reduce the cost of production of a range finder for this retroreflectivity detection use.

Figure 1B:
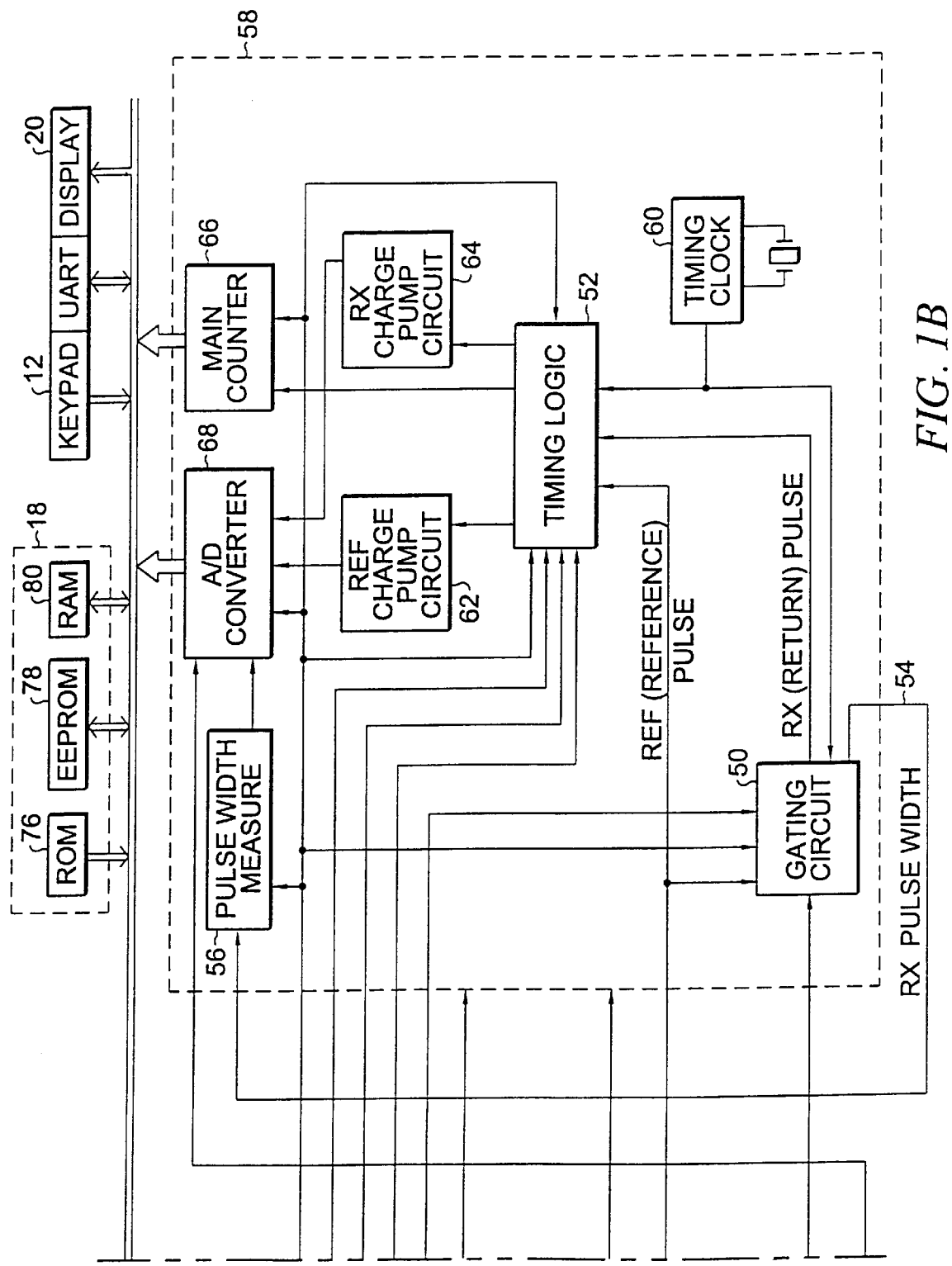
FIG. 1 is a block diagram of a laser speed and range finder in accordance with one embodiment of the present invention.

With reference now to FIG. 1, a simplified logic block diagram of a modified laser speed/range finder 10 in accordance with the present invention is shown. The laser range finder 10 may include a sighting scope for a user to visually select a target, a keypad 12 and trigger 14 which together comprise user operation means, a laser range finding system; a micro-controller including a microprocessor (CPU) 16 and a communicatively associated memory unit 18; and data output means which includes a display 20 and a UART 22 connectable to provide data to an external computer or data logger.

The microprocessor 16 is interfaced to send logic commands and to read and store data from the laser range finder. The microprocessor 16 is configured to supervise the sending of a series of laser pulses spaced by known time intervals toward a target 24 to determine its distance at each time interval. The microprocessor 16 is also configured to compute the distance to the target 24 from the time-of-flight of each individual laser pulse. The microprocessor 16 may also compute the velocity of a moving target relative to a fixed observer from the distances obtained for each of a series of pulses and the time intervals between firing of the individual pulses. Finally, the microprocessor 16 is configured to compute the reflectance of a target 24 as will be described in more detail below.

The laser range finder 10 determines a distance from the detector to a target. The distance is schematically depicted along the dashed sight line from the lenses 26 and 28 of the range finder 10 to the target 24. The range finder includes a high voltage power supply 30 connected to power a laser pulse generator and to provide bias voltage to a light detector. In the preferred embodiment, the laser or LED pulse generator is constructed to produce short pulses (duration of between about 5 and about 100 nanoseconds) of light spaced by a selected fixed interval of between about 1 and about 10 milliseconds. Optionally the range finder may be constructed to allow a user to set a different fixed interval as desired for different targets or target distances and/or speeds.

The laser pulse generator is a laser diode 32 having an operably connected driver, while the light detector is a silicon avalanche photodiode (APD) 34. A high voltage power supply 36 supplies power to the laser diode and the APD detector via linear regulators 38 and 40. Regulator 38 controls the firing voltage applied to the laser diode 32 and the regulator 40 controls the bias voltage applied to the APD 34. Both regulators 38 and 40 are connected via a digital to analog converter 42 to the CPU 16 which controls them to provide the appropriate voltages.

Figure 3:
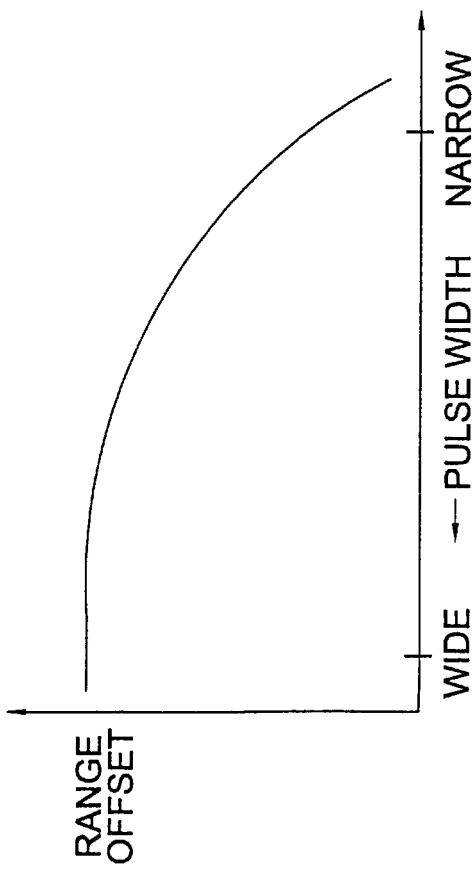
FIG. 3 is a graph of distance correction factors versus return signal pulse width.

The firing voltage is adjusted so that the laser diode 32 outputs the desired optical power. The bias voltage is adjusted so that the APD 34 is operated at the desired sensitivity. The APD 34 produces an RX pulse signal current in response to the receipt of light passing through a filter 44. This pulse signal current is passed through an amplifier 46 so as to be amplified and filtered to reject slowly varying interference signals. The amplified RX signal is then sent to a threshold comparator 48. If the amplified detector signal exceeds the preset threshold of the comparator 48, it is sent to a gating circuit 50 which effectively locks on to a target signal thereby avoiding errors due to detector or circuit noise. The gating circuit 50 and its operation is described in detail in U.S. Pat. No. 5,359,404. The received RX pulse signal is then sent to a timing logic circuit 52. In addition, the gating circuit 50 sends a pulse width signal 54 to a pulse width measuring circuit 56 which utilizes a charge pump circuit as is shown in FIG. 3 to measure the width of the received RX pulse.

The timing analysis circuitry 58 comprises the gating circuit 50, a timing logic 52, a timing clock 60, REF and RX charge pump circuits 62 and 64, a main counter 66, the pulse width measuring circuit 56 and an A/D converter 68. The timing analysis circuitry operates to determine the arrival times of the respective rising edges of reference (REF) and RX pulses in terms of the number of cycles of the timing clock.

The CPU 16 reads and stores the clock count times from the counters and from these values computes the time of flight of the transmitted light pulse. The time of flight is divisible by twice the speed of light to give the distance from the range finder to the target.

Figure 2:
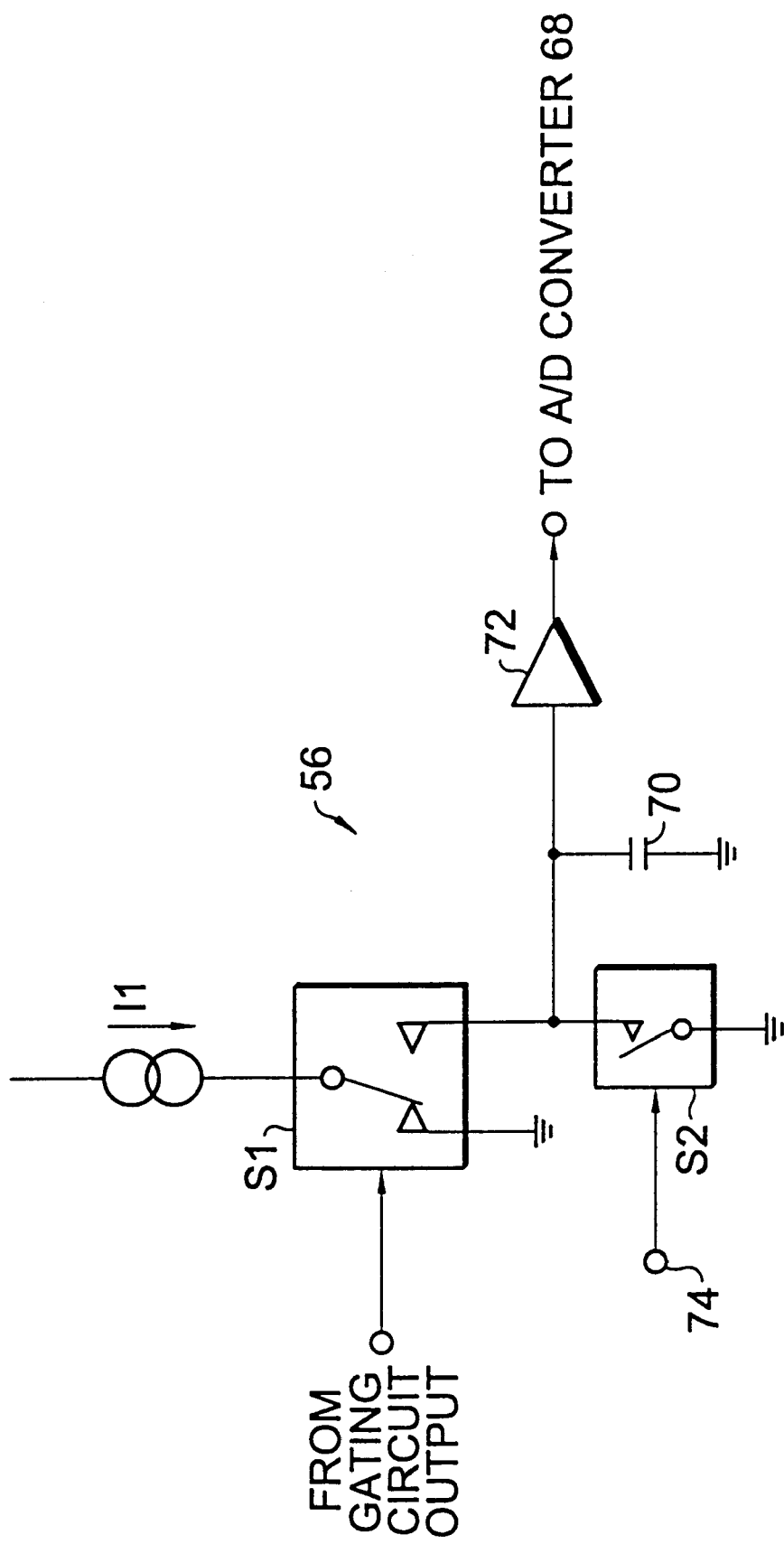
FIG. 2 is a simplified schematic of the charge pump circuit in the timing section of the range finder shown in FIG. 1.

FIG. 2 is the pulse width measuring circuit 56 utilized in the preferred embodiment which is essentially a charge pump circuit. Switch S1 is set to divert the current from a constant current source to ground. A second switch S2 is connected to the other position of the switch S1. Switch S2 is closed so that the capacitor 70 is discharged and therefore the output voltage of the buffer 72 is zero. Before the timing logic 52 sends a RX pulse, the logic reset signal received at input 74 is set inactive, which opens switch S2.

Upon receipt of a RX pulse 54 from the gating circuit 50, switch S1 goes to the opposite position and sends current I1 to charge the capacitor 72 for the duration of the pulse. After the RX pulse 54 has passed, switch S1 diverts current I1 back to ground. Since the current I1 is effectively constant during the pulse, the resulting voltage charged across the capacitor 70 during the pulse is proportional to the width of the pulse. The voltage across the capacitor 70 is buffered by a buffer 72 and sent to an A/D converter 68 where it is converted to an integer value. The A/D converter 68 also receives the output from the REF and RX charge pump circuits 62, 64, which operate in the same manner for determining the time of flight of the pulse and thus the range to the target 24.

The outputs of the A/D converter 68 and the main counter 66 are fed to the microprocessor 16. The target range measurement is preferably derived from the sum of flight times during a selected measurement period where $d=c/2*[\Sigma y_i]/n$. With this algorithm, the calculated range to the target is the range at the midpoint of the measurement period. The range finder 10 of the present invention may optionally be configured to measure and record or display only reflectance (which requires distance measurement), as a single purpose instrument, or it may be configured as a multipurpose instrument to compute reflectance and distance and speed of a moving target. In this latter case, the CPU 16 computes the speed of a target relative to the observer from the difference in distances measured to the target for one or more pairs of light pulses, divided by the time elapsed between firing of the two pulses in each pair.

The CPU 16 is also operably connected to the memory unit 18. The memory unit 18 includes a ROM 76, an EEPROM 78 and a RAM 80 for storing user definable parameters. The EEPROM 78 includes a distance compensation factor database, a power attenuation factor database, and may optionally include a reflectance standard database containing reflectances for various retroreflective surfaces. These databases are particularly utilized in the reflectance measurement mode of operation of the instrument as hereinafter described. These three databases in the EEPROM 78 of the memory unit 18 preferably are programmed at the factory during initial instrument calibration. The Random Access Memory (RAM) 80 may augment the EEPROM 78 for entry of updated calibration and/or standard reflectance data by the user.

The distance correction factors are experimentally determined at the time of manufacture during initial instrument calibration. In this case, the correction data, forming the range offset versus pulse width curve shown in FIG. 3, is stored in the distance correction factor data base or lookup table in the EEPROM 78.

This calibration is performed during manufacture by placing the instrument 10 at a known distance from a standard corner cube retroreflector and firing a number of transmit pulses at the retroreflector, while varying the strength of return signals. The strength of return signals sensed by the instrument 10 is varied by use of a pair of gray scale gradient wheels mounted in the return path. The instrument is used to measure the set distance at different combinations of return signal strengths, over a broad spectrum gradient wheel settings. These distance measurements will differ from the actual, known set distance because of the return signal pulse widths. For example, a large return signal has a wider pulse width than a small return signal. Since the distance measurements are keyed to a particular position on the rising edge of the received pulse, a large pulse rising edge will be seen by the range finder sooner than a small pulse rising edge.

A plot of the range offsets, i.e., difference in distance versus the pulse width or inverse signal strength value is shown in FIG. 3. This curve, representative of the data stored in the distance correction factor data base portion of the EEPROM 78 in the instrument 10, provides the correction factor to apply to any distance measurement based on the signal strength of the return pulse. Thus when the instrument 10 is used to take a distance measurement, the CPU 16 receives the return pulse width information from the A/D converter 68 and compares the return pulse width data with the correction factor database and automatically corrects the measured distance accordingly.

The apparatus 10 in accordance with the present invention utilizes, in addition to the distance correction factor data base just described above, a power attenuation factor database in the EEPROM 78 for determination of reflectance of retroreflective surfaces such as road signs in the reflectance mode of operation. This database is also generated during manufacture utilizing the same calibration setup as above described for generating the data for the distance correction factor data base and provides a similar compilation of power attenuation factors which are utilized to eventually determine absolute values of the coefficient of retroreflection, RA, of an unknown target surface.

Figure 4:
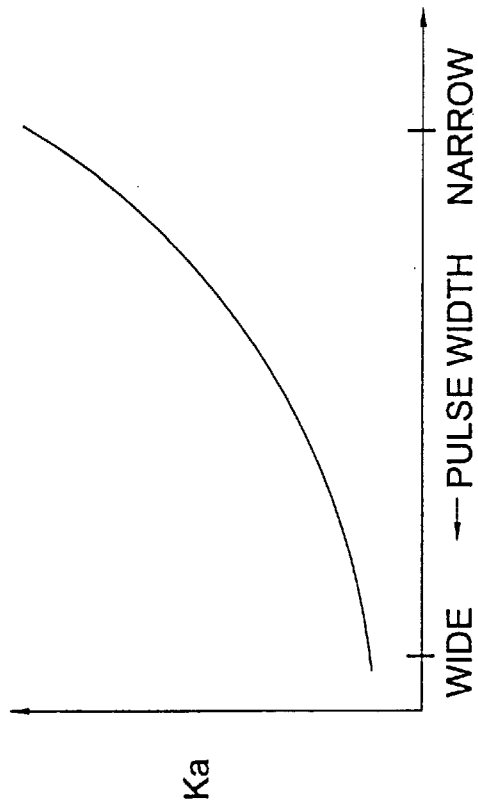
FIG. 4 is a graph of reflectance factors versus return signal pulse width.

This database is generated utilizing a corner cube reflector and a pair of filter wheels as in the initial distance calibration procedure above. However, in this case, a precision optical power meter is removably placed between the filter wheels and the APD 34. A series of pulses is transmitted to the corner cube reflector at various positions of the filter wheels to generate a spectrum of received pulse strengths. A plot of power (Ka) versus measured pulse width is generated and the data stored in the power attenuation data base portion of the EEPROM 78 in the instrument 10. Ka is defined as the ratio of transmit pulse power to receive pulse power. This curve, or plot, generally looks like that shown in FIG. 4. Here, as signal strength decreases, i.e., pulse width narrows, the attenuation coefficient or factor increases. This is the opposite of the distance correction plot shown in FIG. 3 where, as the pulse width narrows, the correction factor decreases. However, the common feature in both Figures is that, in both cases, the parameter measured by the instrument 10 during calibration is the pulse width of the received pulse. In the former instance, also measured in the calibration procedure is the delta between the actual distance and the measured distance. This delta is the correction factor stored in the distance correction database portion for the particular pulse width. In the latter instance, the power meter reading provides the data for the factor stored in the power attenuation factor database.

One further lookup table is preferably provided in the apparatus 10 in accordance with the present invention, although the data may be entered by hand at the time of reflectance measurement. This is a database or lookup table 44 of standard reference reflectance factors for various colors and reflective surfaces, which have been standardized into classes. For example, for a common stop sign, the absolute reflectance RA value should be 20 and a Green B type 2 sign should have an RA of 16. The standard reflectance factor database simply lists corresponding reflectance factor values for selected material identifiers. These standard values may be determined experimentally with the instrument 10 during manufacture or may simply be typical generic values which are stored in the EEPROM 78 for moderately accuracy use. The user of the instrument 10 simply keys in the appropriate standard type on the display 20 and acknowledges to the instrument 10 that that standard value is going to be measured with the next instrument actuation in the reflectance mode of operation. The CPU 16 then knows which type of reflective surface is being measured and recalls the appropriate reference reflectance factor value from this database. The user then points the instrument 10 at the unknown retroreflective target surface such as a stop sign and takes a measurement. The CPU 16 then computes the absolute retroreflectance coefficient (RA) for the unknown surface using the standard reference reflectance factor that the user previously selected.

Alternatively, where the user desires increased accuracy, an experimentally determined current value of the reference retroreflectance factor may be first determined. In this case, the user keys in the appropriate absolute coefficient of retroreflectance for a known sample of retroreflective surface. The user then points the instrument 10 at an example of the known standard which corresponds to the surface that will ultimately be measured, such as a stop sign, and takes a measurement. The instrument then knows 1) what the maximum reflectance should be for that specific retroreflective material (20) as well as the actual measured reflectance factor ($K_{tref}$) of the standard sign. This measured reference reflectance factor ($K_{tref}$) of the reference standard target is stored in RAM 80. The user then takes the instrument 10 into the field and next shoots at the unknown target stop sign. The CPU 16 calculates the measured absolute reflectance $RA_{unknown}$, and indicates the measured RA Now the RA or coefficient of retroreflection is given by the following formula, derived from and in accordance with ASTM Standard E810:

$$RA_{unknown} = K_{tref} d_{unknown}^2 / Ka_{unknown}$$

where:

$RA_{unknown}$ is the absolute reflectance coefficient of the unknown surface;

Ka is Power attenuation factor from the power attenuation factor database in EEPROM 78 according to the received pulse width;

$K_{tref}$ is the measured reference reflectance factor as measured by the range finder apparatus 10 utilizing the standard target stop sign reflectance; and d is the distance between the unknown sign and the range finder apparatus 10 as corrected with the distance correction factor database.

In the example above described:

$$K_{tref} = 20 * Ka_{ref} d_{ref}^2$$

and $$RA_{unknown} = K_{tref} * d_{unknown}^2 / Ka_{unknown}$$

Thus, two measurements are required to be taken for the most accurate reflectance determination. First, a measurement of the sample standard surface is necessary to determine a reference reflectance factor to use. Second, a measurement of reflectance is taken of the unknown surface and the coefficient of retroreflectivity calculated, based on the known reference reflectance factor with the particular instrument. Optionally, the factory provided reference reflectance factors may be used if a less accurate determination is acceptable.

The modified range finder apparatus 10 in accordance with the present invention preferably includes the distance correction and reflectance databases as well as the lookup table of standard reflectance factors for well known signage materials. However, the latter data base or lookup table is optional, as the information may be manually entered by the user. A number of values of Ktref may also optionally be measured and stored in RAM for subsequent field use of the instrument 10 for custom applications.

The modified range finder 10 includes a software routine to analyze the return signal strengths and compute the absolute retroreflectance coefficient for the sign surface being measured and indicate the retroreflectance coefficient directly on the display 20 in accordance with he above equations when the apparatus 10 is fired while the user aims the apparatus 10 at the target sign. One example of this software routine is simplified and shown in the block diagram of FIG. 5.

Figure 5:
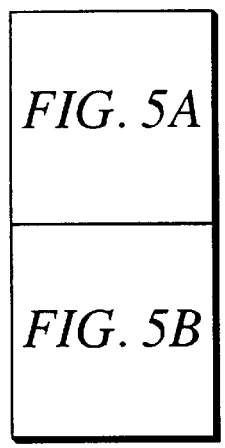
FIG. 5 is a program flow block diagram listing the steps of the method of the invention.
Figure 5A:
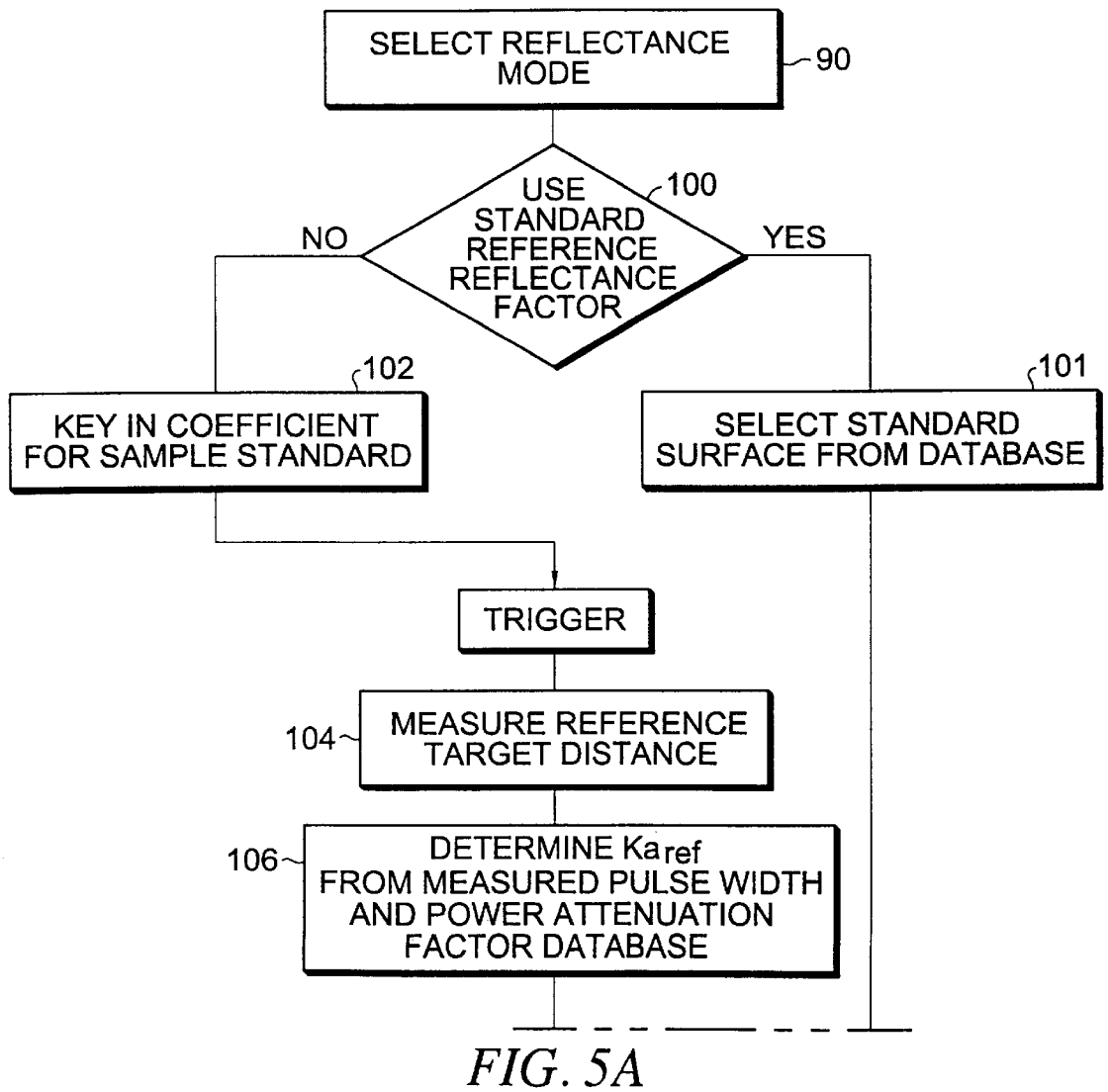
Figure 5B:
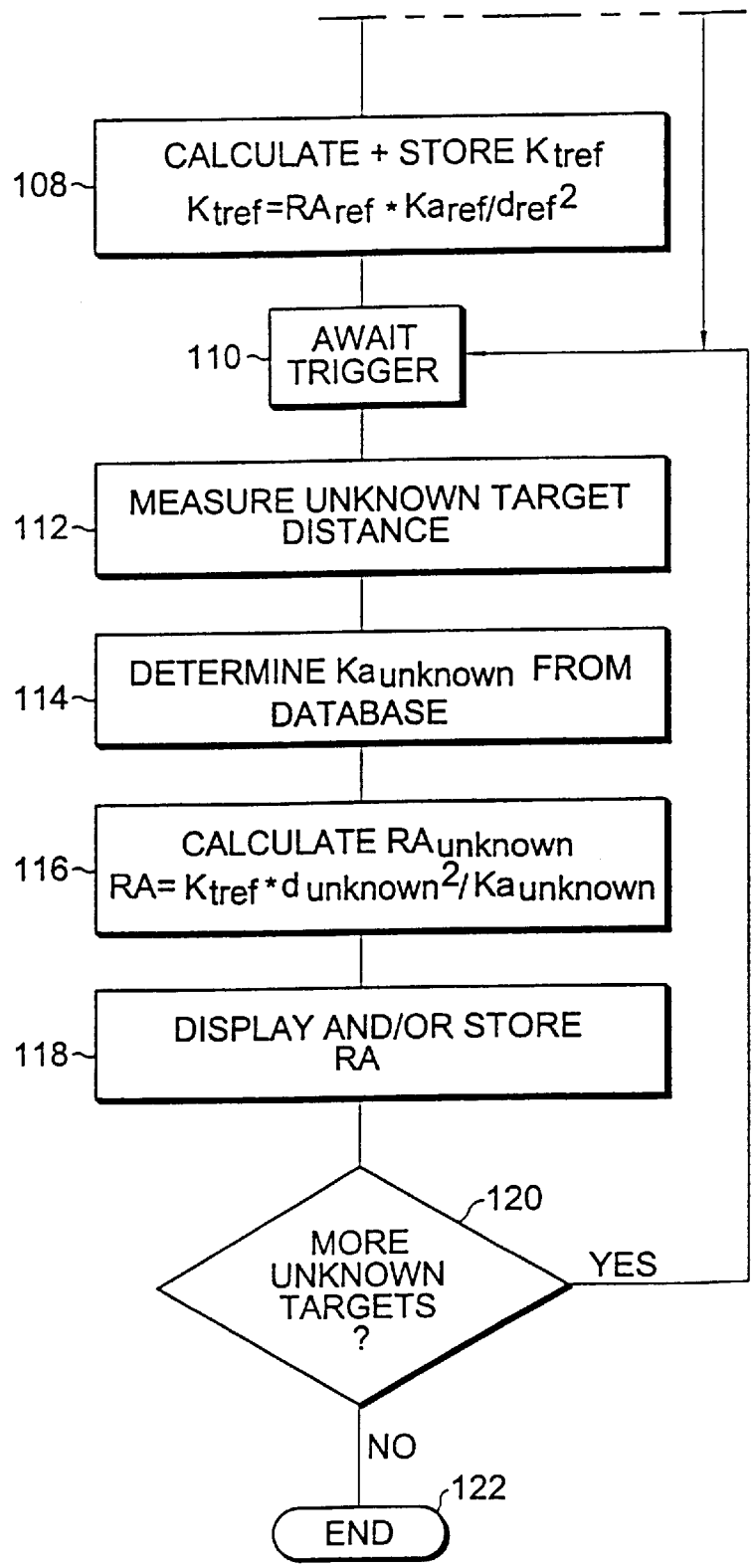

Referring now to FIG. 5, the software steps performed in the processor 16 are shown in operational block diagram form. In operation 90, the user selects the reflectance mode of operation (as necessary) of the apparatus 10 via the keypad 12. This operation sets up the display 20 to query the user in operation 100 whether the standard reference reflectance factors are to be used from the internal instrument database in EEPROM 78. If yes, control transfers to operation 101 where the instrument requests of the correct target type. In this operation, the CPU 16 controls the display 20 to scroll through the contents of the standard target database which contains the standard reference reflectance factors for most potential retroreflective target material types. The operator simply chooses the target type from the list and enters that type. Control then jumps to operation 110 described below. If the answer in operation 100 is no, control transfers to operation 102 where the user keys in a coefficient of retroreflectivity for a sample standard to be measured such as 20 for a stop sign.

When the reference RA value is keyed in, CPU 16 transfers to operation 104 in which the apparatus 10 is aimed and triggered to measure the distance to the reference standard surface utilizing the distance correction factor (FIG. 3) from the distance correction database to correct the measured reference target distance. The corrected range $d_{ref}$ to the reflective standard target stored and control transfers to block 106. In operation 106, the CPU 16 obtains from the power attenuation database in EEPROM 78 the power attenuation factor (Ka) corresponding to the measured return pulse width taken in determining the reference target distance in block 104. The CPU 16 then transfers operation to operation 108 in which the reference target reflectance factor $K_{tref}$ is calculated according to $K_{tref} = RA_{ref} * Ka_{ref} / d_{ref}^2$. The $K_{tref}$ value is stored for subsequent use in the measurement of an unknown target of the same type. Operation then transfers to block 110 where the instrument 10 awaits another trigger command which will be a field measurement of an unknown target.

Upon the user triggering the instrument 10 in operation 110 to take another measurement, the instrument assumes this is an unknown target and operation transfers to block 112 where the distance to the unknown target surface is measured. Control then transfers to block 114 where the Ka for the unknown target is obtained from the measured pulse width determined in block 112 and the power attenuation factor database in the EEPROM 78. The CPU 16 then transfers control to operation 116 in which the coefficient of retroreflectance, RA, is calculated according to the equation $RA = K_{tref} * d_{unknown}^2 / Ka_{unknown}$. Control then transfers to operation 118 where the calculated measured coefficient RA is displayed in display 20. In block 120, the instrument queries the user whether any more unknown targets are to be measured. If so, control shifts back to operation 110 to await another triggering of the instrument 10 at a target. If not, the control program terminates in operation 122.

The instrument software may also optionally provide for storage of a plurality of measured $K_{tref}$ values should the user desire to measure several types of signs and other reflective materials in one field trip. In this case, the software instead of stopping, would query whether any further target types, previously measured according to operations 102 through 108, are to be evaluated. If not, control ends. If there are, then the software routine would simply query for the next type and recall the $K_{tref}$ value for that measured type of material or sign and return control to operation 110 for a subsequent measurement with the recalled value of $K_{tref}$ that is appropriate.

The modified range finder 10 of the present invention has the distinct advantage of being able to measure absolute retroreflectances of signs on location, without substantial regard for the user's distance from the sign. The user simply places the range finder at a sighting distance from the sign and triggers the firing of the laser or LED thus taking a measurement of the range and reflectance. One need not be at the sign. Typically a traffic officer or roadway inspection or maintenance person can simply park beside the roadway and aim the range finder at the particular portion of the sign to be measured and take a reading. Since the area of the sign being illuminated by the range finder is typically only a few inches at 100 yards, both background of the sign and lettering may be separately measured from a respectable distance, thus minimizing the impact of such measurements on traffic flow and operator safety. Further, the use of the modified range finder in accordance with the present invention can completely eliminate the labor intensive measurement techniques currently being utilized by highway maintenance personnel.

While there have been described above the principles of the present invention in conjunction with specific apparatus and method of measuring reflectance techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method of measuring an absolute coefficient of retroreflectance for a retroreflective surface utilizing a pulsed light range finder comprising the steps of:

providing a reference reflectance factor in said range finder for an unknown target retroreflective surface;

measuring a power attenuation factor for an unknown target;

calculating a coefficient of retroreflectance of the unknown target from said measured power attenuation factor and said reference reflectance factor.

2. The method according to claim 1 wherein said step of providing comprises:

providing a database of power attenuation factors (Ka) for pulse widths of received return light pulses in said range finder;

measuring a first distance ($d_{ref}$) to a sample of said standard retroreflective surface by transmitting a light pulse toward and receiving a return light pulse with said range finder;

determining a first pulse width from said return light pulse;

determining a first power attenuation factor ($Ka_{ref}$) for said first pulse width from said power attenuation factor database; and computing said reference reflectance factor ($K_{tref}$) of said sample from the first power attenuation factor, the first measured distance, and a predetermined coefficient of retroreflectance ($RA_{ref}$) for the sample.

3. The method according to claim 2 wherein said step of computing is performed according to the equation $K_{tref}=RA_{ref}*Ka_{ref}/d_{ref}^2$.

4. The method according to claim 2 wherein said step of measuring includes aiming the range finder and transmitting a second light pulse at an unknown target and determining a distance ($d_{unknown}$) to the unknown target from a second return light pulse received in said range finder.

5. The method according to claim 4 wherein said step of measuring further includes determining a second power attenuation factor ($Ka_{unknown}$) for the unknown target from said power attenuation factor database.

6. The method according to claim 5 wherein said step of calculating is performed according to the equation $RA=K_{tref}*d_{unknown}^2/Ka_{unknown}$.

7. The method according to claim 1 wherein said step of providing includes recalling a reference reflectance factor ($K_{tref}$) for said unknown target from a database in said range finder.

8. The method according to claim 7 wherein said step of measuring comprises the steps of:

measuring a distance ($d_{unknown}$) to said unknown target by transmitting a light pulse toward said unknown target and receiving a return pulse from said target;

determining a pulse width of said return pulse from said unknown target; and determining a power attenuation factor ($Ka_{unknown}$) for said pulse width of said return pulse.

9. The method according to claim 8 wherein said step of calculating comprises computing said coefficient of retroreflectance according to the equation $RA=K_{tref}*d_{unknown}^2/Ka_{unknown}$.

10. A method of remotely determining a coefficient of retroreflectance of an unknown retroreflective surface comprising the steps of:

providing a laser range finder for transmitting a light pulse toward a target and receiving a return light pulse from the target, said range finder having a processor for determining distance from said range finder to said target and including a return pulse width determining circuit therein and an attenuation factor data base containing power attenuation factors for various return pulse widths;

transmitting a first light pulse toward a standard target having a known coefficient of retroreflectance;

receiving a first return pulse from the standard target;

determining a first pulse width for the first return pulse;

determining a distance from said range finder to the standard target from the time of flight of the transmitted pulse to and from the target;

determining a first power attenuation factor for the return pulse from the first pulse width and the power attenuation factor data base;

calculating a reference reflectance factor for the standard target from the distance to the standard target, said known coefficient of retroreflectance, and the first power attenuation factor;

transmitting a second light pulse toward an unknown target;

receiving a second return pulse from the unknown target;

determining a second pulse width for the second return pulse from the unknown target;

determining a distance from the range finder to the unknown target;

determining a second power attenuation factor for the return pulse from the unknown target; and calculating an absolute coefficient of retroreflectance for the unknown target from said reference reflectance factor, said second power attenuation factor, and said distance to said unknown target.

11. A method of remotely determining a coefficient of retroreflectance of an unknown retroreflective surface comprising the steps of:

providing a laser range finder for transmitting a light pulse toward a target and receiving a return light pulse from the target, said range finder having a processor for determining distance from said range finder to said target and including a return pulse width determining circuit therein, an attenuation factor data base containing power attenuation factors for various return pulse widths, and a reference reflectance factor database for various target retroreflective surfaces;

recalling from said reference reflectance factor database a reference reflectance factor for an unknown target;

transmitting a light pulse toward said unknown target;

receiving a return pulse from the unknown target;

determining a pulse width for the return pulse from the unknown target;

determining a distance from the range finder to the unknown target;

determining a power attenuation factor for the unknown target from the pulse width and the power attenuation factor datbase; and calculating an absolute coefficient of retroreflectance for the unknown target from said reference reflectance factor, said power attenuation factor, and said distance to said unknown target.

12. An apparatus for determining an absolute coefficient of retroreflectance of a retroreflective surface comprising:

a light pulse transmitter operable to transmit a light pulse toward a target;

a light pulse receiver operable to receive a reflected light pulse from said target;

a processor connected to said transmitter and receiver for determining a distance to said target from the time of flight of said transmitted and reflected light pulse to and from said target;

a pulse width determining circuit connected to said receiver and said processor for determining a pulse width of said reflected pulse; and a power attenuation factor database connected to said processor storing power attenuation factor data for various reflected pulse widths.

13. The apparatus according to claim 12 wherein said processor is operable to calculate an absolute coefficient of retroreflectance of a target from a reference reflectance factor for said target, said measured distance to said target and a power attenuation factor for said reflected pulse width from said power attenuation factor database.

14. The apparatus according to claim 13 further comprising a database of reference reflectance factors connected to said processor for various retroreflective surfaces.

15. The apparatus according to claim 14 further comprising a display connected to said processor for displaying said distance and said coefficient of retroreflectance.

16. The apparatus according to claim 15 wherein said transmitter and receiver are in a laser range finder.

17. The apparatus according to claim 16 wherein said range finder includes said database of reference reflectance factors.

18. A laser range finder adapted for use in determining coefficients of retroreflectance of retroreflective target surfaces, said range finder comprising:

a laser pulse transmitter for transmitting a laser pulse toward a target;

a laser pulse receiver for receiving a return laser pulse reflected from said target;

a microprocessor operably connected to said transmitter and said receiver programmed to compute coefficients of retroreflectance;

a pulse width measuring circuit coupled to said microprocessor for measuring a pulse width of a return laser pulse; and a power attenuation factor database operably coupled to said microprocessor for determining a power attenuation factor (Ka) for a measured return pulse width, wherein said microprocessor utilizes measured return pulse widths and power attenuation factors from said data base to calculate a coefficient of retroreflectance (RA) for a target.

19. The apparatus according to claim 19 wherein said range finder includes a database of reference reflectance factors ($K_{tref}$) for retroreflective surfaces.

20. The apparatus according to claim 19 wherein said microprocessor s programmed to compute a coefficient of retroreflectance (RA) according to the equation $RA = K_{tref} * d_{unknown}^2 / Ka_{unknown}$.

* * * * *